United States Patent
Bradley et al.

(10) Patent No.: US 9,631,528 B2
(45) Date of Patent: Apr. 25, 2017

(54) VEHICLE REDUCED EMISSION DEPLOYMENT

(75) Inventors: Bill C. Bradley, Dallas, TX (US); Joel Craig Diehl, Austin, TX (US); Wayne Turnbow, Centennial, CO (US); Steward B. Nazzaro, Denver, CO (US)

(73) Assignee: Clean Emissions Technologies, Inc., Cornelius, NC (US)

( * ) Notice: Subject to any disclaimer, the term of this patent is extended or adjusted under 35 U.S.C. 154(b) by 1597 days.

(21) Appl. No.: 12/874,838

(22) Filed: Sep. 2, 2010

(65) Prior Publication Data

US 2011/0056185 A1    Mar. 10, 2011

Related U.S. Application Data

(60) Provisional application No. 61/239,760, filed on Sep. 3, 2009.

(51) Int. Cl.
| | |
|---|---|
| F02N 11/08 | (2006.01) |
| F01N 3/00 | (2006.01) |
| F01N 9/00 | (2006.01) |

(52) U.S. Cl.
CPC ............... F01N 3/00 (2013.01); F01N 9/00 (2013.01); *Y02T 10/20* (2013.01); *Y02T 10/47* (2013.01)

(58) Field of Classification Search
USPC ......... 701/102, 112, 123; 180/65.28, 65.245, 180/65.25, 65.27; 903/902–907; 705/13; 340/426.1, 426.11, 426.13, 426.14, 340/426.15, 426.18, 426.19
See application file for complete search history.

(56) References Cited

U.S. PATENT DOCUMENTS

| | | | |
|---|---|---|---|
| 1,726,760 | A | 9/1929 | Otwell |
| 2,467,398 | A | 4/1949 | Miller |
| 2,677,251 | A | 5/1954 | Clark et al. |
| 2,810,293 | A | 10/1957 | George |
| 2,923,171 | A | 2/1960 | George |
| 2,930,242 | A | 3/1960 | George |

(Continued)

FOREIGN PATENT DOCUMENTS

| | | |
|---|---|---|
| CA | 2643165 | 8/2007 |
| CN | 1420034 | 5/2003 |

(Continued)

OTHER PUBLICATIONS

Decision on Rejection, Application No. 2008-556310, Apr. 24, 2012, 8 pages.

(Continued)

*Primary Examiner* — Hai Huynh
*Assistant Examiner* — Gonzalo Laguarda
(74) *Attorney, Agent, or Firm* — Kelly Kordzik; Matheson Keys Daffer & Kordzik PLLC

(57) ABSTRACT

A reduced emission apparatus is coupled to a vehicle such that the vehicle is enabled to operate in a reduced emission mode by use of the reduced emission apparatus. A data acquisition apparatus is mounted on the vehicle and configured to acquire data relating to operation of the vehicle. Security may be provided for the reduced emission apparatus and vehicle-mounted data acquisition apparatus. The credits from operating the reduced emission apparatus apply to resources for deploying the reduced emission apparatus.

9 Claims, 9 Drawing Sheets

(56) References Cited

U.S. PATENT DOCUMENTS

| | | |
|---|---|---|
| 3,209,604 A | 10/1965 | Mitchell |
| 3,241,628 A | 3/1966 | Thomas |
| 3,597,935 A | 8/1971 | Pierrat |
| 3,599,814 A | 8/1971 | Brownfield |
| 3,646,773 A | 3/1972 | Falk |
| 3,716,768 A | 2/1973 | Mason |
| 3,789,962 A | 2/1974 | Frangiudakis |
| 3,792,327 A | 2/1974 | Waldorf |
| 3,882,950 A | 5/1975 | Strohlein |
| 4,193,271 A | 3/1980 | Honigsbaum |
| 4,199,037 A * | 4/1980 | White ............ 180/65.245 |
| 4,271,677 A | 6/1981 | Harr |
| 4,280,330 A | 7/1981 | Harris |
| 4,438,342 A | 3/1984 | Kenyon |
| 4,448,157 A | 5/1984 | Eckstein |
| 4,461,988 A | 7/1984 | Plunkett |
| 4,470,476 A | 9/1984 | Hunt |
| 4,488,447 A | 12/1984 | Gebhardt |
| 4,531,379 A | 7/1985 | Diefenthaler et al. |
| 4,588,040 A | 5/1986 | Albright, Jr. |
| 4,658,599 A | 4/1987 | Kajiwara |
| 4,711,204 A | 12/1987 | Rusconi |
| 4,712,636 A | 12/1987 | Ishimatsu |
| 4,732,229 A | 3/1988 | Lucht |
| 4,825,663 A | 5/1989 | Nijjar |
| 4,828,452 A | 5/1989 | Bolitho |
| 4,846,327 A | 7/1989 | Mayer |
| 4,947,657 A | 8/1990 | Kalmbach |
| 4,976,114 A | 12/1990 | Manning |
| RE33,687 E | 9/1991 | Greer |
| 5,046,326 A | 9/1991 | Havemann |
| 5,048,657 A | 9/1991 | Dissett |
| 5,049,112 A | 9/1991 | Gunsing |
| 5,190,118 A | 3/1993 | Yelton |
| 5,255,733 A | 10/1993 | King |
| 5,267,635 A | 12/1993 | Peterson |
| 5,301,764 A | 4/1994 | Gardner |
| 5,307,645 A | 5/1994 | Pannell |
| 5,343,970 A | 9/1994 | Severinsky |
| 5,346,031 A | 9/1994 | Gardner |
| 5,522,778 A | 6/1996 | Iwase |
| 5,558,588 A | 9/1996 | Schmidt |
| 5,631,532 A | 5/1997 | Azuma et al. |
| 5,637,987 A | 6/1997 | Fattic |
| 5,644,200 A | 7/1997 | Yang |
| 5,653,302 A | 8/1997 | Edye et al. |
| 5,656,921 A | 8/1997 | Farrall |
| 5,667,029 A | 9/1997 | Urban |
| 5,669,842 A | 9/1997 | Schmidt |
| 5,722,911 A | 3/1998 | Ibaraki |
| 5,755,303 A | 5/1998 | Yamamoto |
| 5,773,904 A | 6/1998 | Schiebold |
| 5,775,449 A | 7/1998 | Moroto |
| 5,799,632 A | 9/1998 | Bennett |
| 5,799,744 A | 9/1998 | Yamaguchi |
| 5,800,132 A | 9/1998 | Marietti |
| 5,801,499 A | 9/1998 | Tsuzuki |
| 5,806,617 A | 9/1998 | Yamaguchi |
| 5,810,321 A | 9/1998 | Presson |
| 5,815,824 A | 9/1998 | Saga |
| 5,823,282 A | 10/1998 | Yamaguchi |
| 5,841,201 A | 11/1998 | Tabata |
| 5,842,534 A | 12/1998 | Frank |
| 5,845,731 A | 12/1998 | Buglione |
| 5,847,469 A | 12/1998 | Tabata |
| 5,862,497 A | 1/1999 | Yano |
| 5,881,564 A | 3/1999 | Kishimoto |
| 5,887,670 A | 3/1999 | Tabata |
| 5,896,750 A | 4/1999 | Karl |
| 5,927,953 A | 7/1999 | Marietti |
| 5,942,879 A | 8/1999 | Ibaraki |
| 5,951,614 A | 9/1999 | Tabata |
| 6,009,371 A | 12/1999 | Kobayashi |
| 6,027,032 A | 2/2000 | Aoki et al. |
| 6,038,877 A | 3/2000 | Peiffer |
| 6,059,059 A | 5/2000 | Schmidt-Brucken |
| 6,080,081 A | 6/2000 | Sauermann |
| 6,112,151 A | 8/2000 | Kruse |
| 6,138,788 A | 10/2000 | Bohner |
| 6,151,891 A | 11/2000 | Bennett |
| 6,155,364 A | 12/2000 | Nagano |
| 6,164,400 A | 12/2000 | Jankovic |
| 6,166,631 A | 12/2000 | Kennedy et al. |
| 6,186,255 B1 | 2/2001 | Shimasaki et al. |
| 6,209,672 B1 | 4/2001 | Severinsky |
| 6,238,814 B1 | 5/2001 | Horiguchi et al. |
| 6,251,046 B1 | 6/2001 | Yoshino et al. |
| 6,260,539 B1 | 7/2001 | Minowa |
| 6,269,713 B1 | 8/2001 | Ohke |
| 6,276,161 B1 | 8/2001 | Peiffer |
| 6,318,486 B2 | 11/2001 | Masaki |
| 6,332,257 B1 | 12/2001 | Reed, Jr. |
| 6,338,391 B1 | 1/2002 | Severinsky |
| 6,340,339 B1 | 1/2002 | Tabata |
| 6,351,957 B2 | 3/2002 | Hara et al. |
| 6,367,570 B1 | 4/2002 | Long, III |
| 6,405,818 B1 | 6/2002 | Anthony |
| 6,419,040 B2 | 7/2002 | Kitano |
| 6,427,100 B1 | 7/2002 | Kaku |
| 6,441,506 B2 | 8/2002 | Nakashima |
| 6,480,767 B2 | 11/2002 | Yamaguchi |
| 6,484,831 B1 | 11/2002 | Gauthier |
| 6,488,345 B1 | 12/2002 | Woody |
| 6,488,609 B1 | 12/2002 | Morimoto |
| 6,504,259 B1 | 1/2003 | Kuroda et al. |
| 6,519,513 B2 | 2/2003 | Nakagawa |
| 6,520,160 B2 | 2/2003 | Kojima |
| 6,533,692 B1 | 3/2003 | Bowen |
| 6,554,088 B2 | 4/2003 | Severinsky |
| 6,557,655 B2 | 5/2003 | Ovshinsky |
| 6,558,290 B2 | 5/2003 | Phillips |
| 6,558,827 B1 | 5/2003 | Reiser et al. |
| 6,570,265 B1 | 5/2003 | Shiraishi |
| 6,591,705 B1 | 7/2003 | Reik et al. |
| 6,616,059 B2 | 9/2003 | Sabhapathy et al. |
| 6,616,569 B2 | 9/2003 | Hoang |
| 6,629,027 B2 | 9/2003 | Yamaguchi |
| 6,651,759 B1 | 11/2003 | Gruenwald |
| 6,655,488 B2 | 12/2003 | Braud |
| 6,658,852 B2 | 12/2003 | Frey |
| 6,664,651 B1 | 12/2003 | Kotre |
| 6,672,415 B1 | 1/2004 | Tabata |
| 6,687,603 B2 | 2/2004 | Wakashiro |
| 6,688,411 B2 | 2/2004 | Boggs |
| 6,692,403 B2 | 2/2004 | Charaudeau |
| 6,694,232 B2 | 2/2004 | Saito |
| 6,697,717 B2 | 2/2004 | Shioda et al. |
| 6,705,416 B1 | 3/2004 | Glonner |
| 6,712,165 B1 | 3/2004 | Okazaki |
| 6,721,637 B2 | 4/2004 | Abe |
| 6,735,502 B2 | 5/2004 | Phillips |
| 6,740,987 B2 | 5/2004 | Kitajima |
| 6,745,117 B1 | 6/2004 | Thacher |
| 6,768,932 B2 | 7/2004 | Claypole |
| 6,781,251 B2 | 8/2004 | Takaoka |
| 6,787,932 B2 | 9/2004 | Takaoka |
| 6,796,367 B2 | 9/2004 | Blacquiere |
| 6,802,291 B2 | 10/2004 | Ujifusa |
| 6,805,211 B2 | 10/2004 | Fujikawa |
| 6,808,470 B2 | 10/2004 | Boll |
| 6,840,341 B2 | 1/2005 | Fujikawa |
| 6,851,470 B2 | 2/2005 | Laukhuf |
| 6,857,985 B2 | 2/2005 | Williams |
| 6,862,511 B1 | 3/2005 | Phillips |
| 6,867,509 B1 | 3/2005 | Takaoka |
| 6,868,927 B2 | 3/2005 | Boll |
| 6,881,167 B2 | 4/2005 | Inada |
| 6,892,541 B2 | 5/2005 | Suzuki |
| 6,907,337 B2 | 6/2005 | Phillips |
| 6,915,198 B2 | 7/2005 | Phillips |
| 6,921,984 B2 | 7/2005 | Rogg |
| 6,966,868 B2 | 11/2005 | Stork |
| 6,986,398 B2 | 1/2006 | Obayashi |
| 6,986,645 B2 | 1/2006 | Iwanami |

(56) References Cited

U.S. PATENT DOCUMENTS

| | | |
|---|---|---|
| 6,991,053 B2 | 1/2006 | Kuang |
| 6,994,177 B2 | 2/2006 | Ito |
| 6,994,360 B2 | 2/2006 | Kuang |
| 6,998,727 B2 | 2/2006 | Gray |
| 7,004,273 B1 | 2/2006 | Gruenwald |
| 7,021,409 B2 | 4/2006 | Tamor |
| 7,035,727 B2 | 4/2006 | De La Salle |
| 7,055,337 B2 | 6/2006 | Horn |
| 7,055,636 B2 | 6/2006 | Komiyama |
| 7,062,371 B2 | 6/2006 | Gault et al. |
| 7,091,839 B2 | 8/2006 | Situ |
| 7,102,313 B2 | 9/2006 | Kadota |
| 7,104,347 B2 | 9/2006 | Severinsky |
| 7,104,920 B2 | 9/2006 | Beaty |
| 7,107,776 B2 | 9/2006 | Ikura |
| 7,111,704 B2 | 9/2006 | Johnson |
| 7,130,766 B2 | 10/2006 | Tanase |
| 7,135,785 B2 | 11/2006 | Kropp |
| 7,143,851 B2 | 12/2006 | Masterson |
| 7,147,072 B2 | 12/2006 | Botti |
| 7,223,200 B2 | 5/2007 | Kojima |
| 7,237,634 B2 | 7/2007 | Severinsky |
| 7,240,749 B2 | 7/2007 | Bhavsar |
| 7,273,119 B2 | 9/2007 | Tsuneyoshi |
| 7,275,610 B2 | 10/2007 | Kuang |
| 7,284,594 B2 | 10/2007 | Sanada et al. |
| 7,285,869 B2 | 10/2007 | Syed |
| 7,301,302 B2 | 11/2007 | Yoshii |
| 7,306,064 B2 | 12/2007 | Imazu |
| 7,315,090 B2 | 1/2008 | Yang |
| 7,392,871 B2 | 7/2008 | Severinsky |
| 7,395,787 B1 | 7/2008 | Claypole et al. |
| 7,407,026 B2 | 8/2008 | Tamor |
| 7,455,134 B2 | 11/2008 | Severinsky |
| 7,469,758 B2 | 12/2008 | Iwanaka |
| 7,469,858 B2 | 12/2008 | Edelson |
| 7,487,852 B2 | 2/2009 | Leone |
| 7,497,198 B2 | 3/2009 | Leone |
| 7,506,711 B2 | 3/2009 | Usoro |
| 7,520,353 B2 | 4/2009 | Severinsky |
| 7,543,454 B2 | 6/2009 | Harris |
| 7,551,064 B2 | 6/2009 | Pudelko et al. |
| 7,559,388 B2 | 7/2009 | Severinsky |
| 7,580,808 B2 | 8/2009 | Bos |
| 7,600,595 B2 * | 10/2009 | Harris ................. 180/65.31 |
| 7,921,945 B2 | 4/2011 | Harris |
| 7,921,950 B2 | 4/2011 | Harris |
| 8,346,603 B2 | 1/2013 | Sakakibara et al. |
| 8,386,148 B2 | 2/2013 | Hyde et al. |
| 2001/0005807 A1 | 6/2001 | Kitajima et al. |
| 2001/0022245 A1 | 9/2001 | Rogg |
| 2001/0025220 A1 | 9/2001 | Kaneko et al. |
| 2001/0039230 A1 | 11/2001 | Severinsky |
| 2002/0025220 A1 | 2/2002 | Okuda |
| 2002/0040818 A1 | 4/2002 | Maruyama |
| 2002/0116113 A1 | 8/2002 | Kaneko |
| 2003/0041684 A1 | 3/2003 | Jones, Jr. et al. |
| 2003/0055665 A1 | 3/2003 | Fleming |
| 2003/0062205 A1 | 4/2003 | Konrad |
| 2003/0162631 A1 | 8/2003 | Williams |
| 2003/0217876 A1 | 11/2003 | Severinsky |
| 2004/0093264 A1 | 5/2004 | Shimizu |
| 2004/0157704 A1 | 8/2004 | Stork |
| 2004/0160319 A1 * | 8/2004 | Joao ................. 340/539.1 |
| 2004/0200648 A1 | 10/2004 | Tarasinski |
| 2004/0207205 A1 | 10/2004 | Kikuchi |
| 2005/0043486 A1 | 2/2005 | Okuno |
| 2005/0060076 A1 | 3/2005 | Phillips |
| 2005/0060079 A1 | 3/2005 | Phillips |
| 2005/0060080 A1 | 3/2005 | Phillips |
| 2005/0107198 A1 | 5/2005 | Sowul et al. |
| 2005/0109550 A1 | 5/2005 | Buglione |
| 2005/0113202 A1 | 5/2005 | Miller |
| 2005/0115748 A1 | 6/2005 | Lanier |
| 2005/0173523 A1 | 8/2005 | Yushio et al. |
| 2005/0211479 A1 | 9/2005 | Tamor |
| 2005/0224264 A1 | 10/2005 | Perrin |
| 2005/0231033 A1 | 10/2005 | Ganzel |
| 2005/0251299 A1 | 11/2005 | Donnelly et al. |
| 2006/0058932 A1 | 3/2006 | Garg et al. |
| 2006/0100057 A1 | 5/2006 | Severinsky |
| 2006/0108161 A1 | 5/2006 | Feliss |
| 2006/0111828 A1 | 5/2006 | Alvarez et al. |
| 2006/0129289 A1 | 6/2006 | Kumar et al. |
| 2006/0207274 A1 | 9/2006 | Harris |
| 2006/0213704 A1 | 9/2006 | Mack |
| 2006/0231304 A1 | 10/2006 | Severinsky |
| 2006/0231305 A1 | 10/2006 | Severinsky |
| 2006/0231306 A1 | 10/2006 | Severinsky |
| 2006/0237246 A1 | 10/2006 | Severinsky |
| 2006/0237247 A1 | 10/2006 | Severinsky |
| 2006/0258505 A1 | 11/2006 | Vafidis |
| 2007/0030450 A1 | 2/2007 | Liang |
| 2007/0056784 A1 | 3/2007 | Joe |
| 2007/0080005 A1 | 4/2007 | Joe |
| 2007/0107956 A1 | 5/2007 | Matsubara |
| 2007/0107958 A1 | 5/2007 | Oliver |
| 2007/0124037 A1 | 5/2007 | Moran |
| 2007/0137909 A1 | 6/2007 | Zillmer et al. |
| 2007/0169970 A1 | 7/2007 | Kydd |
| 2007/0181355 A1 | 8/2007 | Harris |
| 2007/0199533 A1 | 8/2007 | Takahashi |
| 2007/0246274 A1 | 10/2007 | Dreibholz |
| 2007/0272456 A1 | 11/2007 | Shiiba |
| 2007/0278022 A1 | 12/2007 | Tanishima |
| 2008/0000700 A1 | 1/2008 | Kotani |
| 2008/0006467 A1 | 1/2008 | Morishita |
| 2008/0012535 A1 | 1/2008 | Takatsuji |
| 2008/0029319 A1 | 2/2008 | Fleckner |
| 2008/0029320 A1 | 2/2008 | Fleckner |
| 2008/0076616 A1 | 3/2008 | Kidokoro |
| 2008/0096711 A1 | 4/2008 | Smith |
| 2008/0100129 A1 | 5/2008 | Lubbers |
| 2008/0154671 A1 | 6/2008 | Delk |
| 2008/0220933 A1 | 9/2008 | Maeda |
| 2008/0236912 A1 | 10/2008 | Ueoka |
| 2008/0243324 A1 | 10/2008 | Harris |
| 2008/0288132 A1 | 11/2008 | King et al. |
| 2009/0018716 A1 | 1/2009 | Ambrosio |
| 2009/0024267 A1 | 1/2009 | Kawai |
| 2009/0030568 A1 | 1/2009 | Amano |
| 2009/0095549 A1 | 4/2009 | Dalum |
| 2009/0107744 A1 | 4/2009 | Foersterling |
| 2009/0177345 A1 | 7/2009 | Severinsky |
| 2009/0254241 A1 | 10/2009 | Basir |
| 2011/0202234 A1 | 8/2011 | Bradley et al. |
| 2013/0073129 A1 | 3/2013 | Martin et al. |

FOREIGN PATENT DOCUMENTS

| | | | |
|---|---|---|---|
| DE | 4204384 A1 | 8/1993 | |
| DE | 19528629 A1 | 2/1997 | |
| EP | 0492152 | 7/1992 | |
| EP | 0645271 | 3/1995 | |
| EP | 1068976 B1 | 1/2001 | |
| EP | 1140533 | 1/2003 | |
| EP | 1297982 | 4/2003 | |
| EP | 1297982 A2 * | 4/2003 | ............... B60K 6/04 |
| EP | 0784743 | 5/2003 | |
| EP | 1759915 | 3/2009 | |
| FR | 2699127 | 6/1994 | |
| FR | 2910101 | 6/2008 | |
| JP | 03239631 A | 10/1991 | |
| JP | 07195955 | 8/1995 | |
| JP | H07240213 | 9/1995 | |
| JP | 10309003 A | 11/1998 | |
| JP | 11146502 | 5/1999 | |
| JP | 11-299004 | 10/1999 | |
| JP | 200023301 A | 1/2000 | |
| JP | 2000-337238 | 12/2000 | |
| JP | 2001-105910 | 4/2001 | |
| JP | 2001-190007 | 7/2001 | |
| JP | 2002118903 | 4/2002 | |
| JP | 2002-247712 | 8/2002 | |

(56) References Cited

FOREIGN PATENT DOCUMENTS

| | | |
|---|---|---|
| JP | 2004017890 | 1/2004 |
| JP | 2004092569 A | 3/2004 |
| JP | 2004136743 | 5/2004 |
| JP | 2004236609 | 8/2004 |
| JP | 2004318370 | 11/2004 |
| KR | 20-1999-0000074 | 1/1999 |
| KR | 10-2004-0000730 | 1/2001 |
| KR | 20-0217389 | 3/2001 |
| TW | 493560 | 7/2002 |
| TW | 505338 | 10/2002 |
| WO | WO 0075532 A1 | 12/2000 |
| WO | WO2004062957 A1 | 7/2004 |
| WO | WO2005003600 A1 | 1/2005 |
| WO | WO2006038968 | 4/2006 |
| WO | WO2006099427 A2 | 9/2006 |
| WO | WO2007030069 A1 | 3/2007 |
| WO | WO2007097819 A2 | 8/2007 |
| WO | WO2009086135 A2 | 7/2009 |

OTHER PUBLICATIONS

International Bureau of WIPO; International Preliminary Report on Patentability, PCT/US2010/047819, Mar. 15, 2012, 7 pages.
United States Patent & Trademark Office, Office Action Summary, U.S. Appl. No. 12/933,415, Jul. 3, 2012.
Hungarian Intellectual Property Office, Search Report and Written Opinion, Application No. 201006777-5, dated May 25, 2012, 14 pages.
Mexican Patent Office, Memo Concerning the Official Action Reported in the Covering Letter; Mexican Patent Application No. MX/a/2010/010249, 8 pages, dated Apr. 10, 2012.
The State Intellectual Property Office of the People's Republic of China, Notice on the First Office Action, Application No. 200980110599.1. dated May 21, 2012.
Intellectual Property Office of Singapore, Search and Examination Report, Singapore Patent Application No. 201007209-8, Aug. 1, 2012.
Korean Intellectual Property Office, Notice to File a Response, Patent Application No. 10-2008-7022954, Sep. 7, 2012.
English Translation, Japanese Patent Application Laid-Open No. 2004-17890 (P2004-17890A), Laid-Open date Jan. 22, 2004.
International Preliminary Report on Patentability and Written Opinion of the International Searching Authority; International Application No. PCT/US2010/028978, dated Sep. 13, 2011, 13 pages.
European Patent Office, Examination Report, Application No. 08797526.4, dated Oct. 12, 2011.
European Patent Office, Search Report, Application No. 08797526.4, dated Sep. 30, 2011.
Translation of EP 0 492 152 A1, European Patent Application No. 91120122.6, filing date Nov. 26, 1991.
European Patent Office, Patent Abstracts of Japan, Publication No. 2004-136743.
European Search Report, Application No. EP11164435, Jun. 20, 2011, 7 pages.
Broderick et al., "Demonstration of Proton Exchange Membrane Fuel Cell as an Auxiliary Power Source for Heavy Trucks," SAE Transactions, 2000, vol. 109, Previously Presented 783-788, NY, NY.
http://www.gears-manufacturers.com/power-take-offs.html; "Power Take-Offs," 3 pages.
European Search Report dated Nov. 23, 2009, Application No. 06850144.4-2207/199439, 6 pages.
International Preliminary Report on Patentability dated Mar. 9, 2009, Application No. PCT/US06/60833, 12 pages.
International Search Report and Written Opinion Dated Mar. 20, 2008, Application No. PCT/US06/60833 9 pages.
International Search Report and Written Opinion Dated Nov. 5, 2008, Application No. PCT/US2008/072672, 6 pages.
International Search Report and Written Opinion dated May 14, 2009, Application No. PCT/US2009/036904, 14 pages.
International Search Report and Written Opinion dated Jun. 12, 2009, Application No. PCT/US2009/038938, 12 pages.
Palumbo, Anthony J., et al, "Ultracapacitor Based Hybrid Booster Drive," 20th International Electric Vehicle Symposium and Exposition (EVS 20): Powering Sustainable Transportation, Aug. 2003, revised Jun. 2004, 16 pages.
Southwest Research Institute, "Fuel cell-assisted truck completes cross-country trek," http://www.swri.org/9what/releases/2005/fuelcell.htm, May 26, 2005, SwRI, San Antonio, Texas.
U.S. Army Public Affairs Office, "TARDEC Sponsors Cross-Country Fuel Cell Truck Expedition," REDECOM Magazine, Jul. 2005, p. 6, Aberdeen Proving Ground, MD.
Search and Examination Report, Singapore Patent Application No. 200805771-3, Oct. 29, 2010, 12 pages.
Office Action, China Patent Application No. 200680053009.2, Nov. 3, 2010, 4 pages.
International Search Report and Written Opinion of the International Searching Authority, International Application No. PCT/US2010/028978, dated Dec. 15, 2010.
First Office Action, Japanese Patent Application No. 2008-556310 dated Apr. 5, 2011, 7 pages.
English language Abstract prepared by Japanese Patent Office, Publication No. 2002-247712, date of publication Aug. 30, 2002.
English language Abstract prepared by Japanese Patent Office, Publication No. 2001-105910, date of publication Apr. 17, 2001.
International Preliminary Report on Patentability, Written Opinion of the International Searching Authority, International Application No. PCT/US2009/036904, dated Sep. 21, 2010.
European Search Report, Application No. EP 11164435; dated Jun. 20, 2011.
United States Patent and Trademark Office, Office Action, U.S. Appl. No. 12/469,493, dated Jun. 10, 2011.
Korean Intellectual Property Office, Notice to File a Response, Preliminary Rejection, Patent Application No. 10-2010-7023374 dated Jan. 11, 2011.
Korean Intellectual Property Office, Notice to File a Response, Preliminary Rejection, Patent Application No. 10-2010-7023374 dated Jul. 11, 2011.
Memo Concerning the Official Action Reported in the Covering Letter; Mexican Patent Application No. MX/a/2010/010249, 4 pages.
English Translation of Office Action for Taiwan Invention Patent Application No. 096105113 dated Jun. 29, 2011, 17 pages.
European Examination Report; Application No. 09728436.8-2421; dated Sep. 1, 2011.
International Search Report and Written Opinion from the International Searching Authority, PCT/US2010/047819, mailed Oct. 28, 2010, 8 pages.
Canadian Intellectual Property Office, Examination Report, Application No. 2,643,165, dated Oct. 24, 2012.
Japanese Patent Office, Notice of Reasons for Rejection, Japanese Patent Application No. 2011-500758, dated Oct. 23, 2012.
Mexican Patent Office, Memo Concerning the Official Action Reported in the Covering Letter; Mexican Patent Application No. MX/a/2010/010249, 5 pages, dated Nov. 27, 2012.
United States Patent & Trademark Office, Non-Final Rejection, U.S. Appl. No. 12/874,838, dated Dec. 5, 2012.
Australian Government IP Australia, Patent Application No. 2009225808, Patent Examination Report No. 1, date of issue, Sep. 11, 2013.
English Translation of Office Action for Taiwan Invention Patent Application No. 096105113, Apr. 2, 2012, 1 page.
European Patent Office, Office Action, Application No. 08797526.4, dated Apr. 19, 2013.
European Patent Office, Office Action, Application No. 10719542.2, dated Jul. 24, 2013.
Hungarian Intellectual Property Office, Examination Report, Application No. 201006777-5, dated Feb. 14, 2013.
IP Australia, Patent Examination Report No. 1, Patent Application No. 2008352923, dated Mar. 15, 2011.
Japanese Patent Office, Second Office Action, Japanese Patent Application No. 2011-500758 dated Jul. 30, 2013.

(56) References Cited

OTHER PUBLICATIONS

Japanese Translation of Japanese Patent Laid-Open Application No. 10-309003 (43) Laid-Open date Nov. 17, 1998, 65 pages.
Korean Intellectual Property Office, Notice to File a Response, Patent Application No. 10-2011-7026244, dated Sep. 16, 2013.
Mexican Patent Office, Memo Concerning the Official Action Reported in the Covering Letter; Mexican Patent Application No. MX/a/2010/010249, 6 pages, dated Nov. 4, 2013.
Office Action, Japanese Patent Application No. 2011-220007, dated Dec. 21, 2012.
Patent Cooperation Treaty, Corrected International Preliminary Report on Patentability, Application No. PCT/US06/60833 dated Mar. 20, 2009, 6 pages.
Patent Cooperation Treaty, Corrected International Preliminary Report on Patentability, International Application No. PCT/US2008/072672 dated Aug. 11, 2010.
Second Office Action, Notice of Reasons for Rejection, Japanese Application No. 2011-220007 dated Sep. 10, 2013.
The State Intellectual Property Office of the People's Republic of China, Notice on the First Office Action, Application No. 200880128284.5, dated Jan. 29, 2013.
The State Intellectual Property Office of the People's Republic of China, Notice on the Second Office Action, Application No. 200980110599.1, dated Mar. 8, 2013.
The State Intellectual Property Office of the People's Republic of China, Notice on the Second Office Action, China Patent Application No. 200680053009.2, dated Dec. 13, 2011, 5 pages.
The State Intellectual Property Office of the People's Republic of China, Translation of Notice on the First Office Action, China Patent Application No. 201080011862.4, Oct. 28, 2013, 2 pages.
The State Intellectual Property Office of the People's Republic of China, Notice on the Third Office Action, China Patent Application No. 200980110599.1, Oct. 23, 2013.
Translation of Report of the First Office Action, Application No. 200880128284.5, dated Aug. 1, 2013.
United States Patent & Trademark Office, Final Office Action, U.S. Appl. No. 12/402,199, Aug. 1, 2012.
United States Patent & Trademark Office, Final Office Action, U.S. Appl. No. 12/748,332, dated Apr. 4, 2013.
United States Patent and Trademark Office, Non-Final Office Action, U.S. Appl. No. 12/402,199, dated Jul. 8, 2013.
United States Patent & Trademark Office, Non-Final Office Action, U.S. Appl. No. 12/933,415, dated Apr. 25, 2013.
United States Patent & Trademark Office, Non-Final Office Action, U.S. Appl. No. 12/933,415, dated Mar. 19, 2013.
United States Patent & Trademark Office, Non-Final Office Action, U.S. Appl. No. 12/748,332, dated May 29, 2012.
United States Patent and Trademark Office, Non-Final Rejection, U.S. Appl. No. 12/721,537, dated Jan. 17, 2013.

\* cited by examiner

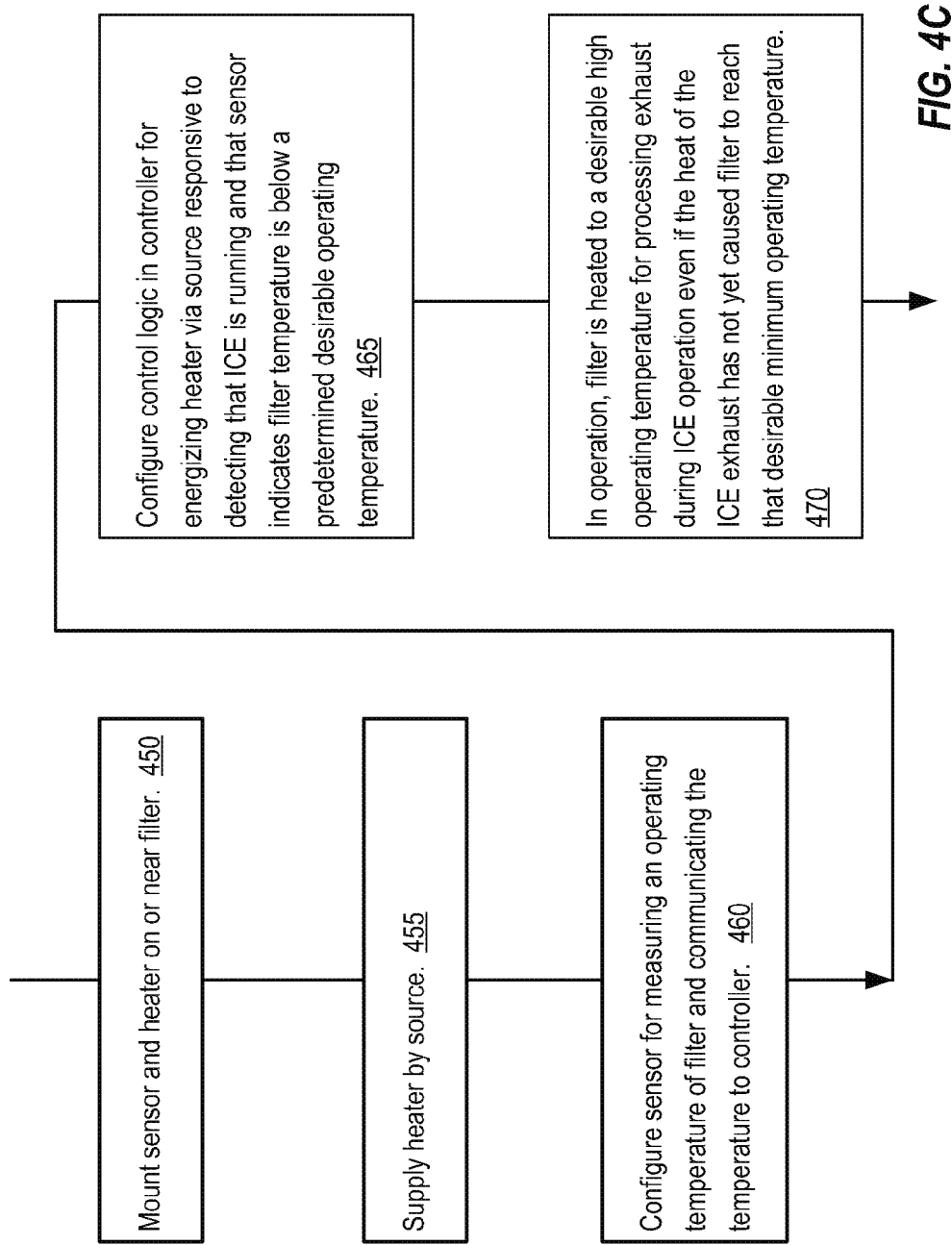

VEHICLE REDUCED EMISSION DEPLOYMENT

RELATED APPLICATIONS

This application claims priority to U.S. provisional patent application Ser. No. 61/239,760 filed on Sep. 3, 2009. This application is related to U.S. provisional patent application Ser. No. 60/661,668, U.S. patent application Ser. No. 11/374,709, U.S. provisional patent application Ser. No. 60/774,732, and U.S. patent application Ser. No. 11/558,786, which are all hereby incorporated herein by reference.

TECHNICAL FIELD

This invention relates to operating a vehicle to reduce emissions and obtaining credit therefrom.

BACKGROUND INFORMATION

The U.S. Environmental Protection Agency (EPA) has set National Ambient Air Quality Standards (NAAQS) for six common air pollutants, also called "criteria" pollutants. The criteria pollutants are carbon monoxide, nitrogen dioxide, ozone, lead, particulate matter and sulfur dioxide. NAAQS are often referred to as federal health standards for outdoor air.

The Clean Air Act, which was passed in 1970 and last amended in 1990, requires the EPA to set NAAQS for pollutants that cause adverse effects to public health and the environment. The Clean Air Act established primary and secondary air quality standards. Primary standards protect public health, including the health of "sensitive" populations such as asthmatics, children, and the elderly. The primary standard is often referred to as the health standard. Secondary standards protect public welfare, including protection against decreased visibility, damage to animals, crops, vegetation, and buildings. Standards are reviewed periodically to ensure that they include the most recent scientific information.

Non-attainment areas are regions within the country where the concentration of one or more criteria pollutants exceeds the level set as the federal air quality standards. Once the EPA announces that an area does not meet the health standard, the State works with businesses, local governments, and the public to reduce the emissions from sources contributing to the non-attainment status of the area.

SUMMARY

One or more embodiments of the present invention concern emission credits relating to a reduced emission mode of vehicle operation. In one aspect, the credits provide incentives for deploying reduced emission operation for vehicles.

One or more embodiments of the present invention concern instances of a vehicle capable of operating in modes in which the vehicle is powered i) in an internal combustion engine (ICE) mode, i.e., powered solely by one or more ICE prime movers and ii) a non-ICE mode, i.e., powered solely by one or more prime movers other than an ICE. Prime movers other than an ICE may include one or more devices such as an electric motor, hydraulic motor, etc.

In one or more embodiments of the present invention, the vehicle is capable of operating in an efficient ICE mode, wherein the vehicle has one or more ICEs operated more efficiently, such as due to use of a non-ICE prime mover concurrently with one or more non-ICE prime movers, use of ICE exhaust treatment equipment, or both.

Herein, reference to operation in a reduced emission ("RE") mode is intended to apply to instances of vehicle operation in the non-ICE mode and to instances of vehicle operation in the efficient ICE mode. That is, reference herein to an embodiment of the invention in which the vehicle is configured to operate in an RE mode is intended to include an embodiment in which a vehicle operates in a non-ICE mode, an embodiment in which a vehicle operates in an efficient ICE mode, or an embodiment in which a vehicle operates in both non-ICE and efficient ICE modes.

BRIEF DESCRIPTION OF DRAWINGS

The invention itself, as well as further objectives and advantages thereof, will best be understood by reference to the following detailed description of an illustrative embodiment when read in conjunction with the accompanying drawings, wherein:

FIGS. 4A, 4B, and 4C are exemplary flow charts illustrating method aspects, according to at least one embodiment of the invention.

DETAILED DESCRIPTION

Figure 1:
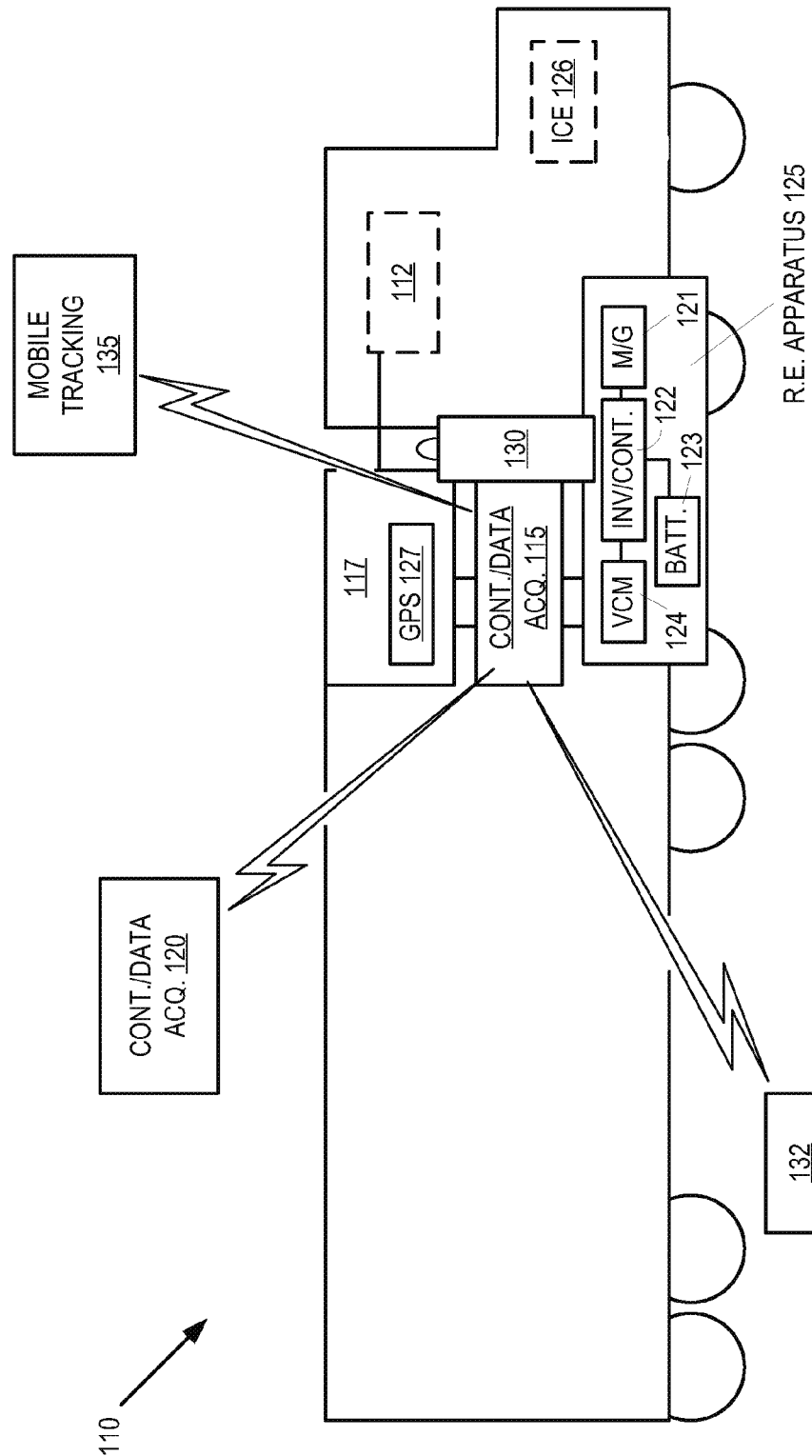
FIG. 1 is an exemplary block diagram illustrating a vehicle having equipment for reduced emission operation and reporting, according to at least one embodiment of the invention.

Referring now to FIG. 1, a vehicle 110 includes a control and data acquisition apparatus (CONT./DATA ACQ.) 115 mounted on the vehicle 110. A remote control and data acquisition (CONT./DATA ACQ.) apparatus 120 is located remote from the vehicle 110 and is configured to receive data acquired by the vehicle-mounted apparatus 115. The vehicle mounted apparatus 115 is configured to acquire operational data for the vehicle 110, including, but not limited to, the following for a driving session:

Time session start
Time session end
Miles beginning of session
Miles ending of session
Driver/operator
Company
Vehicle identification (ID)
Total fuel consumption during session
By date & time stamp
Mode of operation
Odometer reading
Rate of speed (MPH or KPH)
Global positioning system (GPS) location
Fuel consumption (MPG or KPL)
Battery/capacitor amps, volts, watts Battery regeneration/recharge One or more of the vehicle-mounted control and data acquisition apparatus 115 and the remote control and data acquisition apparatus 120 are configured to calculate vehicle performance information, including, but not limited to, one or more of the following.

Total miles per gallon (MPG)
Total fuel consumed
Fuel saved in non-ICE mode
Fuel consumed in ICE mode
Fuel consumed in abatement area(s)
Fuel not consumed in abatement areas
Estimated pollutants not emitted
Estimated pollutants emitted
Estimated pollutants not emitted in abatement areas
Estimated pollutants emitted in abatement areas
Driver performance Performance information may be determined at server level, rather than on the vehicle. Also, one vehicle 110 may be used as a surrogate to determine a standard fuel consumption savings, while not on ICE. Alternatively, engine/regulator standards may be used.

In the above, "pollutants not emitted" refers to an amount of emissions avoided while driving in a non-ICE mode (or at least an efficient ICE mode). One or more emission factors may be endorsed or established by an authority such as a governmental agency or nongovernmental organization. The one or more factors may be used to calculate an amount of emissions that the authority considers would have been created had the ICE (126) of the vehicle 110 been running (or had it been running less efficiently). The factors may be based upon vehicle operating parameters.

In various embodiments of the invention, the vehicle-mounted control and data acquisition apparatus 115 interfaces with the vehicle's existing control or data system 112 to obtain certain of the operational data and may also include one or more additional devices 117 for acquiring certain of the operational data that is not otherwise available or conveniently available from the existing vehicle control or data system 112.

In one or more embodiments of the invention, the vehicle 110 includes a retrofit (RE) apparatus 125. In an embodiment of the invention, the RE apparatus 125 includes an electric traction system as described in one or more of the following U.S. patent applications, which are hereby incorporated herein by reference: U.S. patent application Ser. No. 61/037,851, Ser. No. 11/374,709, Ser. No. 11/558,786, and Ser. No. 12/060,368. In such a system, an electric motor/generator is connected to a power take-off port of a manual transmission of the vehicle via a transfer gear mechanism.

In an embodiment of the invention illustrated in FIG. 1, the RE apparatus 125 includes an electric motor-generator (M/G) 121 retrofitted to the drive train (not shown) of the vehicle 110 (such as in an arrangement as disclosed in one or more of the above-identified U.S. patent applications) and powered and directly controlled by an inverter/controller (INV/CONT.) 122, which is supplied by a battery (BATT.) 123. The RE apparatus 125 further includes a vehicle control module (VCM) 124, which communicates with existing vehicle devices 112 via a data bus, for example, to detect vehicle speed, engine status, etc. The vehicle control module 124 also communicates with the inverter/controller 122 to provide further control aspects responsive to existing vehicle devices 112. According to this arrangement, the electric motor-generator 121 propels the vehicle 110 (supplied by the battery 123) when the vehicle control module 124 is in an electric traction motor control mode. Correspondingly, the electric motor-generator 121 may recharge the battery 123 via regenerative braking and also when the vehicle control module 124 is in a control mode wherein the existing internal combustion engine 126 propels the vehicle 110.

In other embodiments of the invention, the RE apparatus 125 does not include electric traction motor or motor-generator.

In an embodiment of the invention, a lender may finance installation of a retrofit RE apparatus 125 on a vehicle 110 for a borrower, where the vehicle 110 is owned and operated by the borrower. The financing may include secured credit, e.g., credit that is legally secured by the RE apparatus 125, and possibly also by the vehicle 110.

In one or more embodiments of the invention, the vehicle-mounted control and data acquisition apparatus 115 is configured to communicate one or more selected items of the above-described operational data and calculations to the remote control and data acquisition apparatus 120, which is controlled by one or more party, or agent thereof, including: a vehicle owner, vehicle operator, lender, emission credit aggregator, emission credit clearing house, and a governmental organization. The remote apparatus 120 may be controlled by an agent of the lender. The vehicle-mounted apparatus 115 and remote apparatus 120 may be configured to communicate the selected data in one or more of the following circumstances: on demand, automatically at predetermined time intervals, and/or automatically in response to one or more predetermined events.

In embodiments of the invention, the vehicle-mounted apparatus 115 may download the data locally to a device 132 capable of then uploading the data to the remote apparatus 120. Such communications may be via cell phone type transmissions, WiFi, and other wireless measures. Bluetooth communication means may also be implemented in the system.

The installed RE apparatus 125 may communicate with a global positioning system ("GPS") 127 mounted on the vehicle 110. The GPS 127 is shown in the illustrated embodiment of the invention as included among the one or more devices 117, but is included among the devices 112 in another embodiment of the invention. The GPS 127 may be configured to broadcast the location of the vehicle 110 to the remote apparatus 120 and/or a remote, mobile-tracking device 135 accessible by the lender. In respective embodiments of the invention, the broadcasting is continuous, at intervals, upon default by borrower and/or upon demand by the lender. In the illustrated embodiment of the invention, the remote device 135 is a portable device, so that an agent of the lender may use the device 135 to follow and track down the vehicle 110 in order to retrieve the vehicle 110. The GPS 127 may also be configured to display to the vehicle operator one or more routes in which the vehicle can be driven to reduce emissions, i.e., increase operation in the RE mode. Alternatively, a separate display, such as described herein with respect to FIG. 7, may be utilized for such a function.

The RE apparatus 125 is configured to communicate with the control and data acquisition apparatus 115. The apparatus 115 calculates emission credits, or data for emission credits, i.e., data upon which the remote apparatus 120 can compute emission credits, based on time operating in the RE mode instead of the ICE mode. The credits may be based at least partly on emission factors predetermined by an agency such as the U.S. Environmental Protection Agency, which factors may be based at least partly upon vehicle operating parameters. Accordingly, the vehicle-mounted apparatus 115 is configured to acquire data from the vehicle 110 and calculate emissions that the agency considers would have been created had the ICE 126 been running during the interval when the vehicle 110 was instead operating in the RE mode.

The vehicle-mounted apparatus 115 is further configured such that the GPS 127 enables the apparatus 115 to relate the emission reductions to particular geographic zones for reporting or banking Such zones may include non-attainment zones and areas otherwise having operating restrictions or goals, which may include residential areas and may include ports and other staging areas, for example. Accordingly, in an embodiment of the invention, the apparatus 115 is configured to calculate the emission credits further in response to vehicle location at the time of calculated emission reductions.

In this regard, the control and data acquisition apparatus 115 is configured to determine the location of the vehicle 110 from the GPS 127 and to compare the location to a map that indicates predetermined boundaries of certain geographic areas, such as ports or other special areas. Examples of other special areas include known emission-limit non-attainment areas, and areas having known high volume vehicle traffic and particular land uses, such as residential use, for example. (This arrangement may be particularly advantageous for addressing noise ordinances. Accordingly, it should be understood that the term "emission" includes noise emission, as the term is used herein.)

If the control and data acquisition apparatus 115 determines, responsive to the comparing, that the vehicle 110 is within the boundaries of a such a predetermined geographic area, the apparatus 115 switches the RE apparatus 125 into the RE mode (if the apparatus 125 is not already in the RE mode). In an alternative, the apparatus 115 locks in the RE mode while the vehicle 110 remains within the area. Further, in an embodiment of the invention, the apparatus 115 is initialized with maximum speeds for respective predetermined geographic areas and is configured to limit the vehicle's maximum speed while the vehicle 110 remains within such a speed-limited area. The apparatus 115 may also communicate that the vehicle 110 is within an attainment area, or any other area for that matter, and begin determining how the vehicle 110 can be positioned to have a greater disposition towards the RE mode. Furthermore, while approaching a predetermined geographic area, the logic in the vehicle may implement processes to ensure the batteries are charged or charging.

Moreover, the apparatus 115 may display to the vehicle operator one or more routes to travel that would increase (even maximize) operation in the RE mode.

In one embodiment of the invention, the RE apparatus 125, the vehicle-mounted apparatus 115, and the GPS 127 have one or more security means for preventing the apparatus 125, the apparatus 115, and the GPS 127 from being removed other than by the lender or the lender's authorized agent and which permits only the lender or the lender's authorized agent to modify the RE apparatus 125, the vehicle-mounted apparatus 115, and the GPS 127, or at least their GPS-related control and data acquisition aspects. In one embodiment of the invention, security means includes a physical security device 130. In one embodiment of the invention, security means includes control logic in the GPS 127 and control logic in the RE apparatus 125, as well as means for communicating one or more control signals between the control logic in GPS 127 and the control logic of the RE apparatus 125, wherein the GPS 127 control logic generates a keep alive security signal at time intervals, which is communicated by communication means to control logic of the RE apparatus 125 and to the control and data acquisition apparatus 115. Communication means may include a hard wired connection or short range wireless communication transmitter and receiver.

In one arrangement of this embodiment, the vehicle control module 124 shuts down the vehicle 110 in response to failure to receive the security signal from the GPS 127 within a predetermined time. In one arrangement of this embodiment, the control and data acquisition apparatus 115 sends a notification to the control and data acquisition apparatus 120 or the tracking device 135 in response to failure to receive the security signal from the GPS 127 within a predetermined time. Further, in an embodiment of the invention, the apparatus 125, the apparatus 115, and the GPS 127 are configured such that a password or key are required to reconfigure them, which prevents tampering by unauthorized persons. Typically, these devices never shut down a moving or operating vehicle; rather, they prevent it from being started again after the key has been turned to the off position.

Regarding the calculated emission reduction credits that result from operation of the vehicle 110 in the RE mode, the credits may be owned or transferred to someone other than the vehicle owner, such as the lender, so that the value of the credits are, in one alternative, used to offset the financing payments by the borrower to the lender. This is particularly facilitated since arrangements described herein provide that i) the RE apparatus 125, the control and data acquisition apparatus 115, and the GPS 127 are physically located on the vehicle 110, and ii) tamper proof functioning of the RE apparatus 125, the control and data acquisition apparatus 115 allows the lender to remotely determine the location of the vehicle 110 and track down the vehicle 110 in order to retrieve the vehicle 110, which may be done upon payment default, as one condition.

Figure 2:
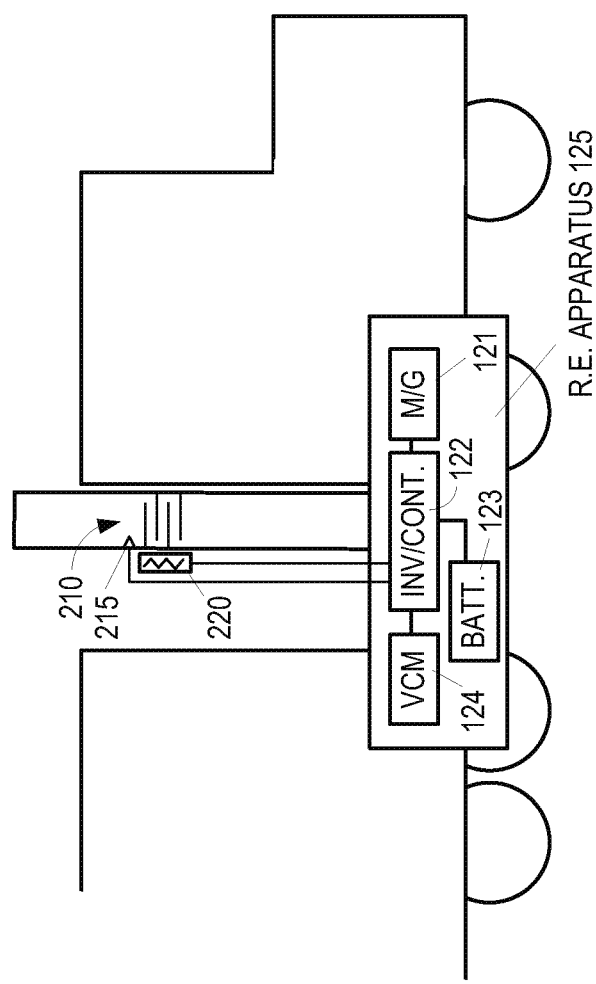
FIG. 2 is an exemplary block diagram illustrating a reduced emission apparatus, according to at least one embodiment of the invention.

Referring now to FIG. 2, in one or more embodiments of the invention, the RE apparatus 125 includes an ICE exhaust filter 210 (which may include a catalyst), a sensor 215 mounted on or near the filter 210, and a heater 220 supplied by a source, such as a battery 123 or a fuel cell. The sensor 215 may be configured for measuring an operating temperature of the filter 210 and communicating the temperature to a controller, such as the VCM 124 or the controller 122. Control logic in the controller 122 may be configured for energizing the heater 220 responsive to detecting that the ICE 126 of the vehicle 110 is running, such as detecting via the VCM 124, and that the sensor 215 indicates the filter 210 temperature is below a predetermined desirable operating temperature. In this way, the filter 210 will be heated to a desirable high operating temperature for processing exhaust during ICE operation even if the heat of the ICE exhaust has not yet caused the filter 210 to reach that desirable minimum operating temperature.

Due to the relatively small size of emissions credits for individual vehicles, or even fleets of vehicles, it may be inefficient for an emission credit granting agency to administer a system of granting vehicle emission credits. The inefficiency may arise on both sides of transactions, i.e., both with regard to collecting and submitting emission reduction data and with regard to granting credits. Accordingly, embodiments of the present invention include aspects that relate to aggregating and clearing.

Figure 3:
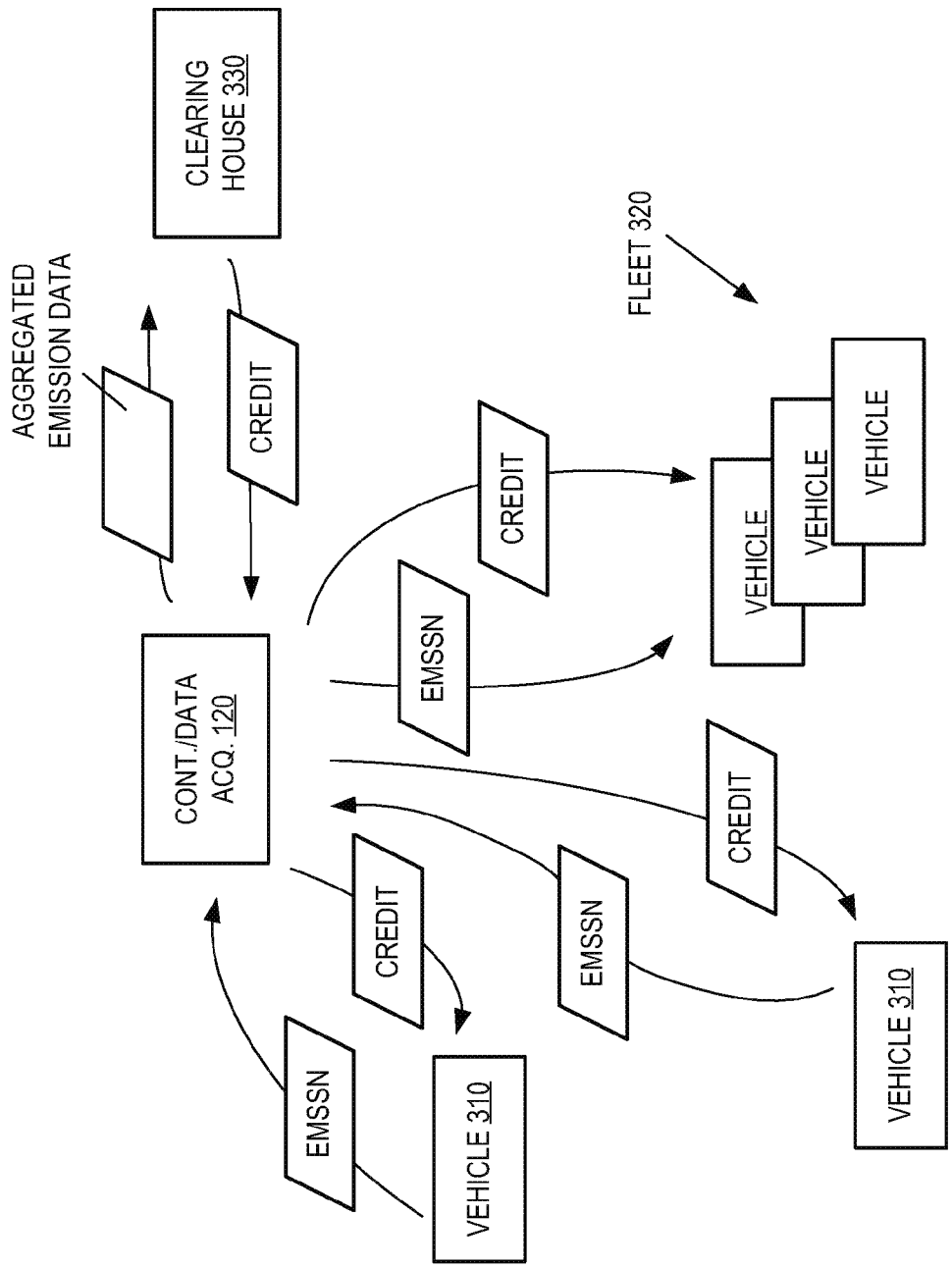
FIG. 3 is an exemplary block diagram illustrating aggregating aspects, according to at least one embodiment of the invention.

Referring now to FIG. 3, aggregating aspects include the control and data acquisition apparatus 120 initializing emission reduction accounts for the vehicles 310 or the fleets 320 of vehicles, collecting emission reduction data for the individual vehicles 310 or fleets 320, aggregating the collected vehicle emission reduction records and submitting them to an agency or a clearing house 330 for obtaining a credit, obtaining a credit for an aggregated collection, and distributing the credits to the vehicle owners or vehicle creditors in exchange for a fee. Clearing aspects include receiving emission reduction credit requests, verification of the requests, granting credits for the requests, and balancing credits granted relative to credits authorized. In an embodiment of the present invention, aspects of emission credit clearing may extend beyond vehicle-oriented aspects.

In some instances, regulations may impose emissions restrictions that limit vehicle operations, which may include outright prohibition of vehicle operation. A desire to limit vehicle emissions may even arise due to private objectives or agreements. Consequently, emission credits may be more valuable to one vehicle operator than to another. Accordingly, a need may arise for trading of vehicle emission credits to other vehicle operators, or even unrelated parties, such as power companies. Accordingly, an embodiment of the present invention includes aspects that relate to vehicle emission credit trading.

It should be understood from the foregoing that embodiments of the invention are useful for obtaining emission credits, swapping credits, determining and reducing penalties, and for increasing RE mode operation in abatement areas and areas of maximum credits or penalties. Due to the incentives provided to drivers by emission credits, embodiments of the present invention tend to maximize the RE mode of operation in certain geographic zones and to correspondingly increase emission reduction credits and reduce emissions. In other words, vehicle operators are encouraged to operate the vehicle in the RE mode. The emission credits may be associated with drivers and vehicles and provide a measure of driver and vehicle performance. This can be accomplished by storing a database in one of the control processing units in the vehicle, or by one of the described remote systems, wherein the database stores the above described vehicle operating parameters on a per driver/vehicle basis. Furthermore, the operating parameters for a vehicle described herein may be used by the data processing systems herein to calculate estimated fuel savings when the vehicle is operating in the RE mode, since it is known how to calculate miles per gallon for a vehicle based on speed, distance, and other operating parameters. Additionally, estimated reductions in PM, $NO_x$, $CO_2$, and other emissions can be calculated for RE mode operations. Such data can then be further analyzed to obtain rebates and tax credits from government agencies, and to enable fleet owners to determine aggregate fuel savings over time.

In an exemplary embodiment of the invention, the analyzer may have the following attributes:

Reads J1939 CAN Buses operating at 500 kb. (Optionally, read J1708, as well.)

Runs onboard software that frequently samples and summarizes MPH, Fuel Consumption, SOC, and minutes devices are on for subsequent evaluation at the back end. Other information may be sent in raw form to be evaluated and tabulated later. Calculates on board those items that would significantly reduce the bandwidth needed for transmission does other calculations at the backend on servers. Information is provided to the analyzer on one CAN Bus channel at 500 kb.

Dynamically determines location of the vehicle and provide the coordinates to the onboard processor in this unit. The analyzer is initialized with up to about 1000 predetermined geolocation zones ("fenced areas") and determines during vehicle operation if the vehicle is in or out of these Ones. The analyzer communicates this over the CAN Bus to the vehicle control system.

Has outgoing and incoming cellular communications capability.

Changes the onboard data logger/analyzer software via remote communication.

Changes software and parameters to other devices on the vehicle via the J1939 CAN Bus.

Has 3-axis accelerometer configured to detect crashes and unusual vehicle behavior. Results from the accelerometer are transmitted via the CAN Bus.

Communicates and exchanges data over the cellular network GSM with remote application services using the HTTP POST/GET protocol and POX (Plain Old XML), SOAP, and REST message protocol.

In an exemplary embodiment, the data collected by the analyzer includes:

```
Idle
Total Minutes MPH = 0
Total Minutes MPH = 0 on ET
Total Minutes MPH = 0 on ICE
Total Gallons MPH = 0 on ICE
Minutes Heater on
Minutes A/C on
Minutes Break Compressor on
Minutes Power Steering on
Minutes Motor Fan on
>0 MPH to <=15 MPH in ET
Number of Minutes <=15
Number of times from >0 MPH to <=15 MPH (start-offs)
Average MPH >0 MPH to <=15 MPH
Miles traveled in ET Mode MPH >0 MPH to <=15 MPH
Minutes Heater on
Minutes A/C on
Minutes Break Compressor on
Minutes Power Steering on
Minutes Motor Fan on
>0 MPH to <=15 MPH in ICE Mode
Number of Minutes <=15
Number of times from >0 MPH to <=15 MPH (start-offs)
Average MPH >0 MPH to <=15 MPH
Miles traveled in ICE Mode MPH >0 MPH to <=15 MPH
MPG in ICE MPH >0 MPH to <=15 MPH
Minutes Heater on
Minutes A/C on
Minutes Break Compressor on
Minutes Power Steering on
Minutes Motor Fan on
>15 MPH to <=20 MPH in ET
Number of Minutes >15 MPH to <=20 MPH
Number of times from >15 MPH to <=20 MPH
Average MPH >15 MPH to <=20 MPH
Miles traveled in ET Mode MPH >15 MPH to <=20 MPH
Minutes Heater on
Minutes A/C on
Minutes Break Compressor on
Minutes Power Steering on
Minutes Motor Fan on
>15 MPH to <=20 MPH in ICE Mode
Number of Minutes <=15
Number of times from >15 MPH to <=20 MPH
Average MPH >15 MPH to <=20 MPH
Miles traveled in ICE Mode MPH >15 MPH to <=20 MPH
MPG in ICE MPH >15 MPH to <=20 MPH
Minutes Heater on
Minutes A/C on
Minutes Break Compressor on
Minutes Power Steering on
Minutes Motor Fan on
Over 20 MPH (Over Set Point)
Number of Minutes >20 MPH
Average MPH when > 20 MPH
Miles traveled >20 MPH
Gallons used in ICE when >20 MPH
MPG in ICE Mode at >20 MPH
```

-continued

Figure 4A:
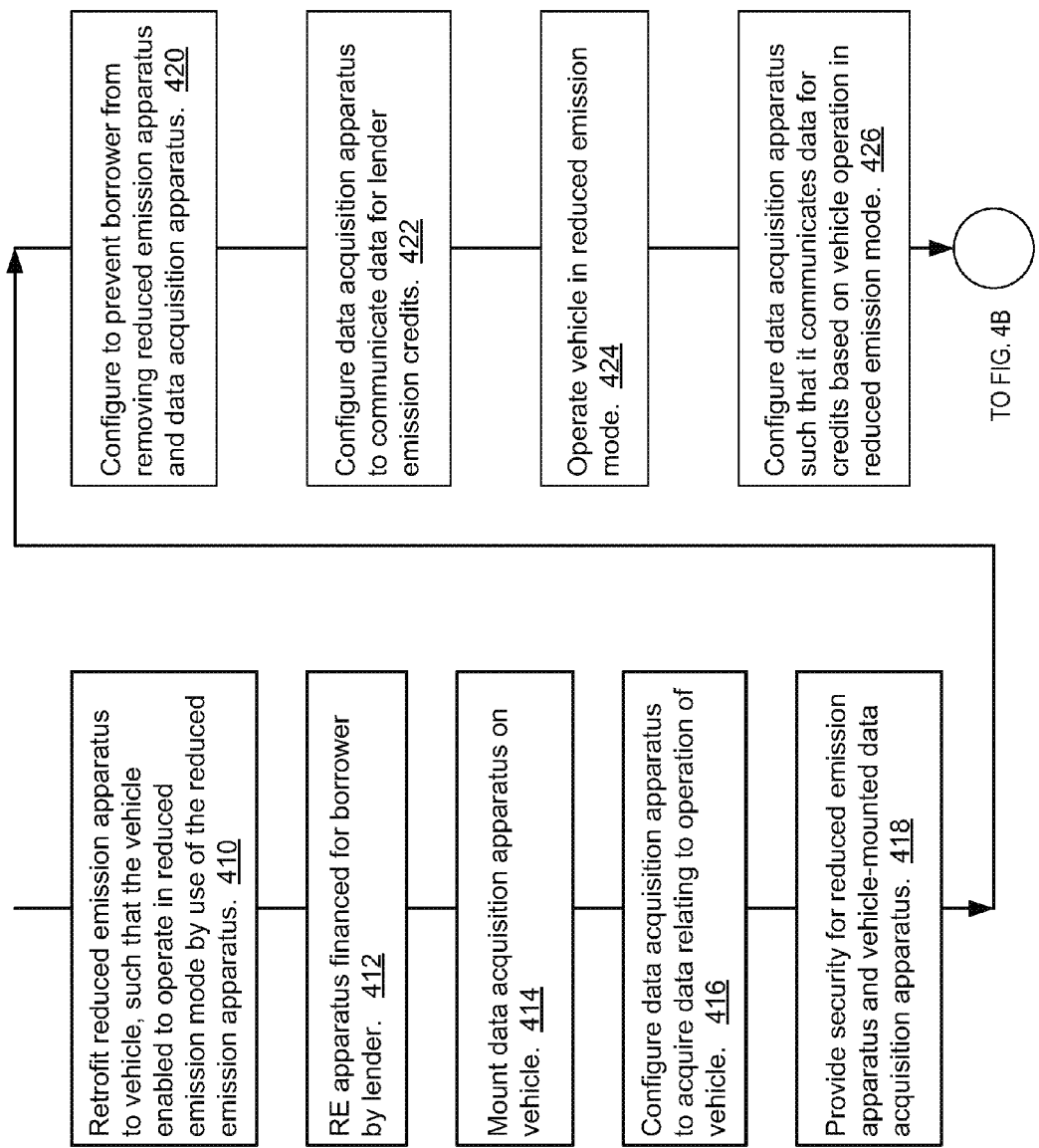

Minutes Heater on
    Minutes A/C on
    Minutes Break Compressor on
    Minutes Power Steering on
    Minutes Motor Fan on
    Battery State of Charge (SOC) Entering
    High SOC
    Low SOC
    Average SOC
    Battery State of Charge (SOC) Leaving
    High SOC
    Low SOC
    Average SOC
    Faults & Warnings
    Fault_Code
    Battery_Charge_Warning_WC
    Inverter_Blower_Warning_WC
    Motor_Blower_Warning_WC
    AIR_CON_Warning_WC
    Brake_Comp_Warning_WC
    Power_Steering_Warning_WC
    Battery_Charge_Down_WC
    Inverter_Blower_Down_WC
    Motor_Blower_Down_WC
    AIR_CON_Down_WC
    Brake_Comp_Down_WC
    Power_Steering_Down_WC
    EXT_MTR_Cold_Or_Open_WC
    INT_MTR_Cold_Or_Short_WC
    INT_MTR_Sensor_Open_WC
    HSNK_Cold_Or_Open_WC Referring now to FIG. 4A, method aspects regarding the arrangement shown in FIG. 1 are illustrated, according to one or more embodiments of the invention. A reduced emission apparatus may be retrofitted 410 to a vehicle (or be installed as OEM), such that the vehicle is enabled to operate in a reduced emission mode by use of the reduced emission apparatus. The reduced emission apparatus may be optionally financed 412 for a borrower by a lender. A data acquisition apparatus is installed 414 on the vehicle and configured 416 to acquire data relating to operation of the vehicle. Security means may be optionally provided 418 for the reduced emission apparatus and vehicle-mounted data acquisition apparatus, which includes configuring 420 the reduced emission apparatus to prevent the borrower from removing the reduced emission apparatus and data acquisition apparatus. The data acquisition apparatus may be optionally configured 422 to communicate data for lender or operator/owner emission credits. The vehicle operates 424 in the reduced emission mode. The data acquisition apparatus configuration includes configuration such that data acquisition apparatus communicates 426 data for the credits computed based on vehicle operation (in the reduced emission mode).

Figure 4B:
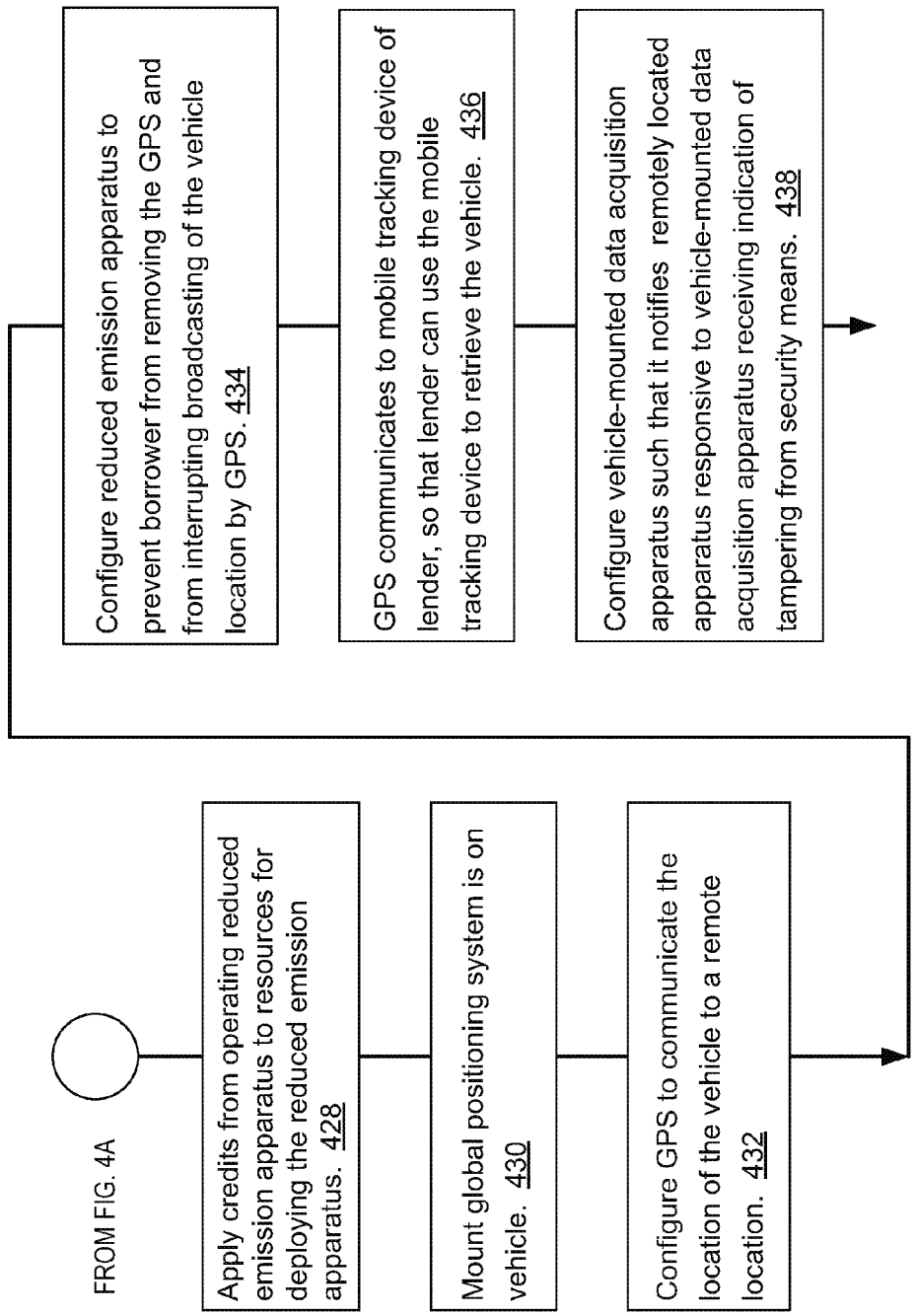

Referring now to FIG. 4B, the credits from operating the reduced emission apparatus apply 428 to resources for deploying the reduced emission apparatus. That is, in an embodiment of the invention, the credits may accrue directly to a lender for payments due from the borrower for the lender financing of the reduced emission apparatus.

In another aspect, a global positioning system is mounted 430 on the vehicle and configured 432 to communicate the location of the vehicle to a remote location and one or more of control units on board the vehicle, and may also communicate other telemetry.

In another optional aspect, providing 418 security means includes configuring 434 the reduced emission apparatus to prevent the borrower from removing the global positioning system and from interrupting broadcasting of the vehicle location by the global positioning system.

In another optional aspect, communicating the location of the vehicle to a remote location includes communicating 436 to a mobile tracking device of the lender, so that lender can use the mobile tracking device to retrieve the vehicle.

In another optional aspect, configuring the vehicle-mounted data acquisition apparatus includes configuring the vehicle-mounted data acquisition apparatus such that the apparatus notifies 438 a remotely located apparatus responsive to the vehicle-mounted data acquisition apparatus receiving an indication of tampering from security means.

With reference now to FIG. 4C, method aspects regarding the arrangement shown in FIG. 2 are illustrated, according to one or more embodiments of the invention. The sensor 215 and heater 220 are mounted 450 on or near the filter 210, and the heater 220 is supplied 455 by a source. The sensor 215 is configured 460 for measuring an operating temperature of the filter 210 and communicating the temperature to the controller 230. Control logic in the controller 230 is configured 465 for energizing the heater 220 via a source responsive to detecting that the ICE of the vehicle 110 is running and that the sensor 215 indicates the filter 210 temperature is below a predetermined desirable operating temperature. In operation, the filter 210 is heated 470 to a desirable high operating temperature for processing exhaust during ICE operation even if the heat of the ICE exhaust has not yet caused the filter 210 to reach that desirable minimum operating temperature.

Figure 5:
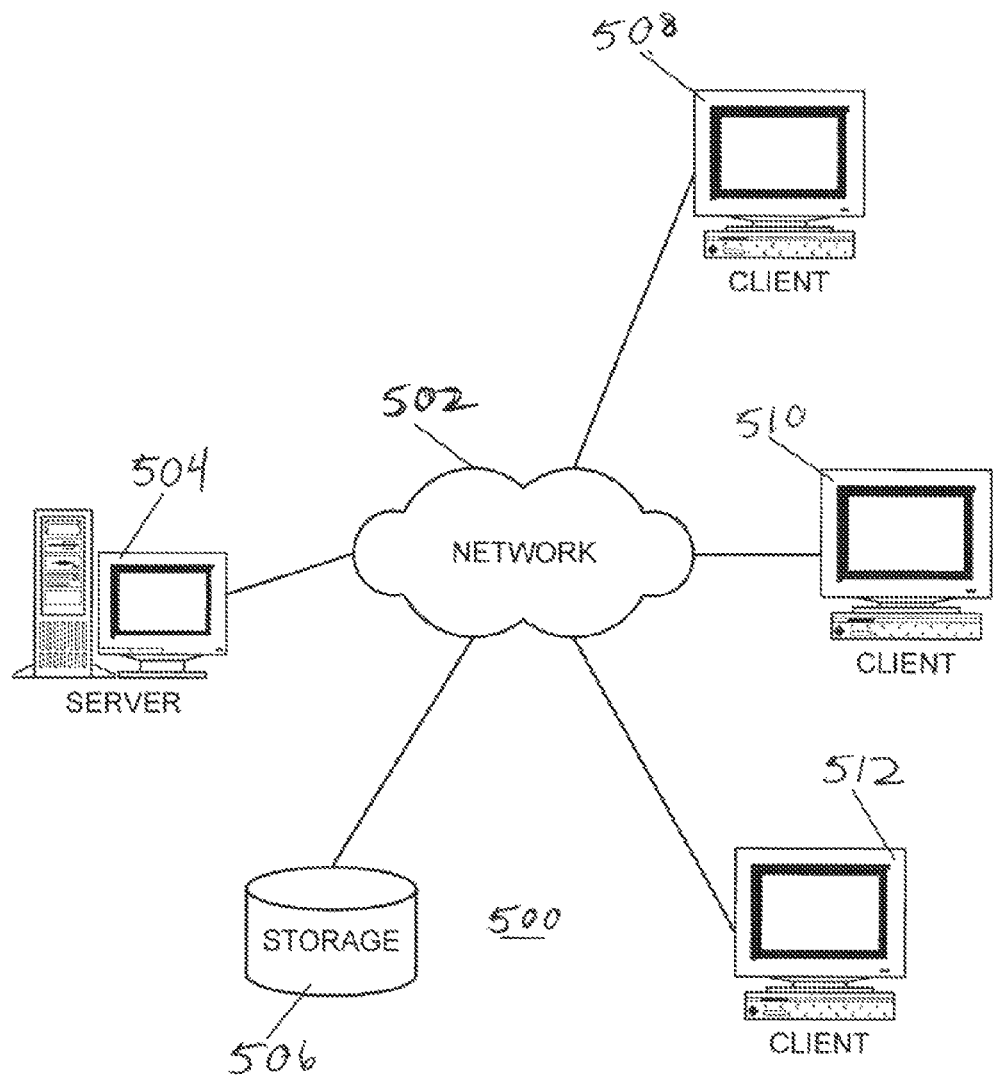
FIG. 5 is an exemplary block diagram illustrating a distributed data processing system, according to at least one embodiment of the invention.

With reference now to FIG. 5, a pictorial representation of a data processing network system 500 is presented in which the present invention may be implemented. The network system 500 contains a network 502, which is the medium used to provide communications links between various devices and computers connected together within the network system 500. The network 502 may include connections, such as wire, wireless communication links, and/or fiber optic cables, etc.

In the depicted example, a server 504 is connected to the network 502 along with a storage unit 506. In addition, clients 508, 510, and 512 are connected to the network 502. In an embodiment of the invention, the vehicle-mounted control and data acquisition apparatus 115 of a first instance of the vehicle 110 (see FIG. 1) includes client 508; the vehicle-mounted control and data acquisition apparatus 115 of a second instance of the vehicle 110 includes client 510, etc.; and the remote control and data acquisition apparatus 120 (see FIG. 1) includes a server 504 and the storage unit 506.

The clients 508, 510, and 512 may be application specific embedded systems, general purpose embedded systems, personal computers, or network computers, for example. In the depicted example, the server 504 provides data, such as boot files, operating system images, and applications to the clients 508, 510, and 512. The clients 508, 510, and 512 are clients to the server 504. The network data processing system 500 may include additional servers, clients, and other devices not shown. In the depicted example, the network data processing system 500 may be the Internet with the network 502 representing a worldwide collection of networks and gateways that use the TCP/IP suite of protocols to communicate with one another.

Figure 6:
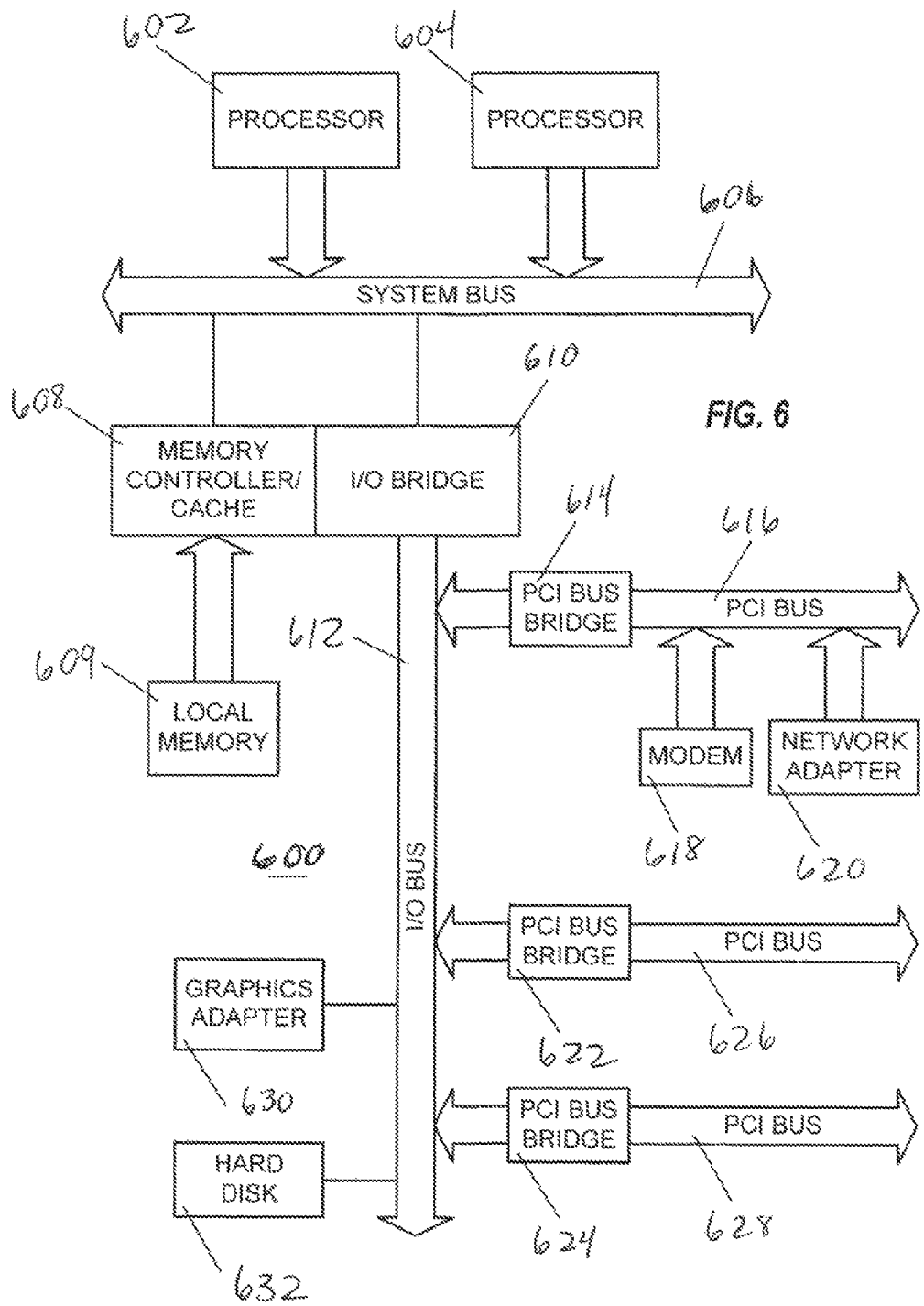
FIG. 6 is an exemplary block diagram of a server apparatus, according to at least one embodiment of the invention.

Referring to FIG. 6, a block diagram of a data processing system 600 that may be implemented as a server, such as the server 504 in FIG. 5, is depicted in accordance with an embodiment of the present invention. The data processing system 600 may be a symmetric multiprocessor (SMP)

system including a plurality of processors 602 and 604 connected to a system bus 606. Alternatively, a single processor system may be employed. Also connected to the system bus 606 is a memory controller/cache 608, which provides an interface to a local memory 609. An I/O bus bridge 610 is connected to the system bus 606 and provides an interface to the I/O bus 612. The memory controller/cache 608 and the I/O bus bridge 610 may be integrated as depicted.

A peripheral component interconnect (PCI) bus bridge 614 connected to the I/O bus 612 provides an interface to a PCI local bus 616. A number of modems may be connected to the PCI local bus 616. Typical PCI bus implementations will support four PCI expansion slots or add-in connectors. Communications links to network computers 508, 510, and 512 in FIG. 5 may be provided through a modem 618 and a network adapter 620 connected to the PCI local bus 616 through add-in boards. Additional PCI bus bridges 622 and 624 provide interfaces for additional PCI local buses 626 and 628, from which additional modems or network adapters may be supported. In this manner, the data processing system 600 allows connections to multiple network computers. A memory-mapped graphics adapter 630 and a hard disk 632 may also be connected to the I/O bus 612 as depicted, either directly or indirectly.

Those of ordinary skill in the art will appreciate that the hardware depicted in FIG. 6 may vary. For example, other peripheral devices, such as optical disk drives and the like, may be used in addition to or in place of the hardware depicted. The depicted example is not meant to imply architectural limitations with respect to the present invention.

The data processing system 600 depicted in FIG. 6 may be, for example, an IBM e-Server pSeries system, a product of International Business Machines Corporation in Armonk, N.Y., running the Advanced Interactive Executive (AIX) operating system or LINUX operating system.

The server 504 may provide a suitable website or other internet-based graphical user interface accessible by users to enable user interaction for aspects of an embodiment of the present invention. In one embodiment, a Netscape web server, IBM Websphere Internet tools suite, an IBM DB2-UDB database platform and a Sybase database platform may be used in conjunction with a Sun Solaris operating system platform. Additionally, components such as JBDC drivers, IBM connection pooling, and IBM MQ series connection methods may be used to provide data access to several sources. The term webpage as it is used herein is not meant to limit the type of documents and applications that might be used to interact with the user. For example, a typical website might include, in addition to standard HTML documents, various forms, Java applets, Javascript, active server pages (ASP), Java Server Pages (JSP), common gateway interface scripts (CGI), extensible markup language (XML), dynamic HTML, cascading style sheets (CSS), helper applications, plug-ins, and the like.

Figure 7:
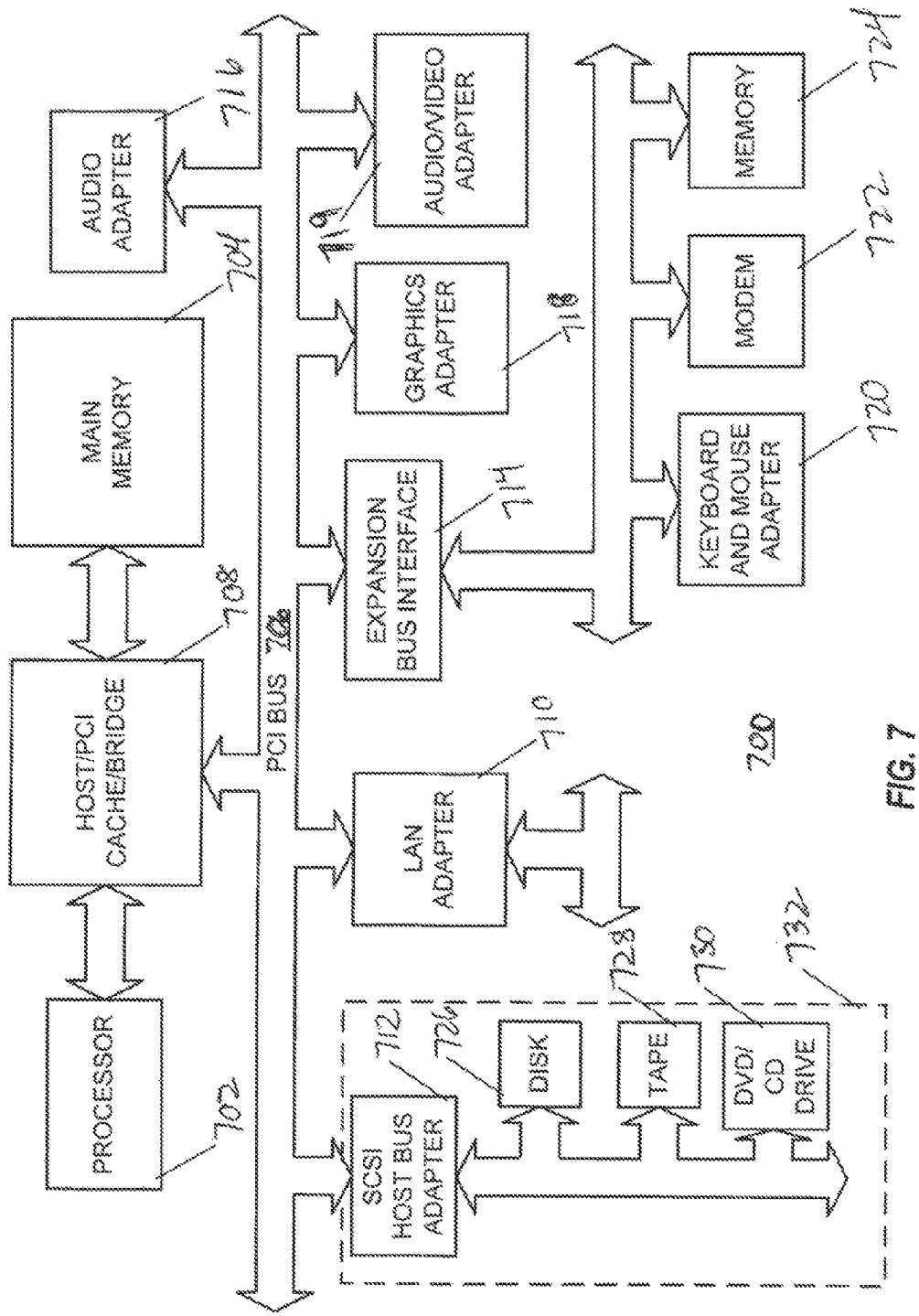
FIG. 7 is an exemplary block diagram of a client apparatus, according to at least one embodiment of the invention.

With reference now to FIG. 7, a block diagram illustrating a data processing system 700 is depicted in which aspects of an embodiment of the invention may be implemented. The data processing system 700 is an example of a client computer. The data processing system 700 employs a peripheral component interconnect (PCI) local bus architecture. Although the depicted example employs a PCI bus, other bus architectures such as Accelerated Graphics Port (AGP) and Industry Standard Architecture (ISA) may be used. A processor 702 and a main memory 704 are connected to a PCI local bus 706 through a PCI bridge 708. The PCI bridge 708 also may include an integrated memory controller and cache memory for the processor 702. Additional connections to the PCI local bus 706 may be made through direct component interconnection or through add-in boards. In the depicted example, a local area network (LAN) adapter 710, a small computer system interface (SCSI) host bus adapter 712, and an expansion bus interface 714 are connected to the PCI local bus 706 by direct component connection. An audio adapter 716, a graphics adapter 718, and an audio/video adapter 719 are connected to the PCI local bus 706 by add-in boards inserted into expansion slots. A display 740 may be coupled to the adapter 719.

The expansion bus interface 714 provides a connection for a keyboard and mouse adapter 720, a modem 722, and additional memory 724. The SCSI host bus adapter 712 provides a connection for a hard disk drive 726, a tape drive 728, and a CD-ROM drive 730. Typical PCI local bus implementations will support three or four PCI expansion slots or add-in connectors.

An operating system runs on the processor 702 and is used to coordinate and provide control of various components within the data processing system 700 in FIG. 7. The operating system may be a commercially available operating system, such as Windows XP®, which is available from Microsoft Corporation. An object oriented programming system such as Java may run in conjunction with the operating system and provide calls to the operating system from Java programs or applications executing on the data processing system 700. "Java" is a trademark of Sun Microsystems, Inc. Instructions for the operating system, the object-oriented operating system, and applications or programs are located on storage devices, such as the hard disk drive 726, and may be loaded into the main memory 704 for execution by the processor 702.

Those of ordinary skill in the art will appreciate that the hardware in FIG. 7 may vary depending on the implementation. Other internal hardware or peripheral devices, such as flash ROM (or equivalent nonvolatile memory) or optical disk drives and the like, may be used in addition to or in place of the hardware depicted in FIG. 7. Also, the processes of the present invention may be applied to a multiprocessor data processing system.

As another example, the data processing system 700 may be a stand-alone system configured to be bootable without relying on some type of network communication interface, whether or not the data processing system 700 comprises some type of network communication interface. As a further example, the data processing system 700 may be a device configured with ROM and/or flash ROM in order to provide non-volatile memory for storing operating system files and/or user-generated data.

The depicted example in FIG. 7 and above-described examples are not meant to imply architectural limitations. The present invention may reside on any data storage medium (i.e., floppy disk, compact disk, hard disk, tape, ROM, RAM, etc.) used by a computer system. (The terms "computer," "system," "computer system," and "data processing system" and are used interchangeably herein.)

As will be appreciated by one skilled in the art, aspects of the present invention may be embodied as a system, method, or program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, biological, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and program products according to embodiments of the invention. It will be understood that each block of the flowchart illustrations and/or block diagrams, and combinations of blocks in the flowchart illustrations and/or block diagrams, can be implemented by program instructions. These program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

One or more databases may be included in a host for storing and providing access to data for the various implementations. One skilled in the art will also appreciate that, for security reasons, any databases, systems, or components of the present invention may include any combination of databases or components at a single location or at multiple locations, wherein each database or system includes any of various suitable security features, such as firewalls, access codes, encryption, de-encryption, and the like.

The database may be any type of database, such as relational, hierarchical, object-oriented, and/or the like. Common database products that may be used to implement the databases include DB2 by IBM (White Plains, N.Y.), any of the database products available from Oracle Corporation (Redwood Shores, Calif.), Microsoft Access by Microsoft Corporation (Redmond, Wash.), or any other database product. The database may be organized in any suitable manner, including as data tables or lookup tables.

Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a key field in each of the manufacturer and retailer data tables. A key field partitions the database according to the high-level class of objects defined by the key field. For example, a certain class may be designated as a key field in both the first data table and the second data table, and the two data tables may then be merged on the basis of the class data in the key field. In this embodiment, the data corresponding to the key field in each of the merged data tables is preferably the same. However, data tables having similar, though not identical, data in the key fields may also be merged by using AGREP, for example.

The flowcharts and block diagrams in the figures illustrate the architecture, functionality, and operation of possible implementations of systems, methods and program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules implemented in software for execution by various types of processors may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module. Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the descriptions herein, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Those skilled in the art having read this disclosure will recognize that changes and modifications may be made to the embodiments without departing from the scope of the present invention.

It should be appreciated that the particular implementations shown and described herein are illustrative of the invention and its best mode and are not intended to otherwise limit the scope of the present invention in any way. Other variations are within the scope of the following claims.

While this specification contains many specifics, these should not be construed as limitations on the scope of the invention or of what can be claimed, but rather as descriptions of features specific to particular implementations of the invention. Certain features that are described in this specification in the context of separate implementations can also be implemented in combination in a single implementation. Conversely, various features that are described in the context of a single implementation can also be implemented in multiple implementations separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As used herein, the terms comprises, comprising, or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as essential or critical.

Headings or titles herein are not intended to limit the invention, embodiments of the invention or other matter disclosed under the headings.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system comprising:
   a reduced emission apparatus connected to a vehicle and configured to operate the vehicle in a reduced emission mode, wherein the reduced emission apparatus further comprises an electric motor/generator connected to a power take-off port of a manual transmission of the vehicle via a transfer gear mechanism;
   a data acquisition apparatus connected to the vehicle and configured to acquire data pertaining to operation of the vehicle; and
   a control logic apparatus connected to the vehicle and coupled to the reduced emission apparatus and the data acquisition apparatus, the control logic apparatus configured to encourage operation of the vehicle in the reduced emission mode by the reduced emission apparatus in response to an analysis of the data pertaining to the operation of the vehicle by the data acquisition apparatus.

2. The system of claim 1, wherein the system further comprises a security device for the reduced emission apparatus and the data acquisition apparatus, wherein the security device is configured to prevent removal or disablement of the reduced emission apparatus or data acquisition apparatus, wherein the data acquisition apparatus is configured to communicate data for emission credits, the credits being based on vehicle operation in the reduced emission mode, and wherein the credits from operating the reduced emission apparatus apply to resources for deploying the reduced emission apparatus.

3. A system comprising:
   a reduced emission apparatus connected to a vehicle and configured to operate the vehicle in a reduced emission mode;
   a data acquisition apparatus connected to the vehicle and configured to acquire data pertaining to operation of the vehicle; and
   a control logic apparatus connected to the vehicle and coupled to the reduced emission apparatus and the data acquisition apparatus, the control logic apparatus configured to encourage operation of the vehicle in the reduced emission mode by the reduced emission apparatus in response to an analysis of the data pertaining to the operation of the vehicle by the data acquisition apparatus, wherein the system further comprises a security device for the reduced emission apparatus and the data acquisition apparatus, wherein the security device is configured to prevent removal or disablement of the reduced emission apparatus or data acquisition apparatus, wherein the data acquisition apparatus is configured to communicate data for emission credits, the credits being based on vehicle operation in the reduced emission mode, and wherein the credits from operating the reduced emission apparatus apply to resources for deploying the reduced emission apparatus; and
   a global positioning system coupled to the vehicle configured to communicate a location of the vehicle to a remote location, wherein the security device is configured to prevent removal of the global positioning system and from interrupting broadcasting of the location of the vehicle by the global positioning system.

4. The system of claim 3, wherein communicating the location of the vehicle to a remote location includes communicating to a mobile tracking device, so that the mobile tracking device can be used to retrieve the vehicle.

5. The system of claim 1, wherein, the control logic apparatus is configured to Charge batteries used for energizing an electric motor that is configured to propel the vehicle when the data acquisition system receives data from a global positioning system that the vehicle is within a specified distance from a geographic area designated as restricting vehicle emissions beyond a threshold level.

6. A system comprising:
   a reduced emission apparatus connected to a vehicle and configured to operate the vehicle in a reduced emission mode;
   a data acquisition apparatus connected to the vehicle and configured to acquire data pertaining to operation of the vehicle; and
   a control logic apparatus connected to the vehicle and coupled to the reduced emission apparatus and the data acquisition apparatus, the control logic apparatus configured to encourage operation of the vehicle in the reduced emission mode by the reduced emmission apparatus in response to an analysis of the data pertaining to the operation of the vehicle by the data acquisition apparatus, wherein the control logic apparatus is configured to prevent starting of an internal combustion engine that propels the vehicle when the vehicle is located within a specified geographic area.

7. The system of claim 6, wherein the specified geographic area is designated as restricting vehicle emissions beyond a threshold level.

8. The system of claim 1, wherein the reduced emission mode comprises the vehicle producing less noise during operation.

9. The system of claim 1, wherein the control logic apparatus displays one or more routes the vehicle can travel to increase operation in the reduced emission mode.

* * * * *